(12) United States Patent
Wu et al.

(10) Patent No.: US 8,600,293 B2
(45) Date of Patent: Dec. 3, 2013

(54) RELAY GAIN ASSIGNMENT METHOD AND RELAY GAIN ASSIGNMENT DEVICE

(75) Inventors: Chun-Jung Wu, Tainan (TW); David W. Lin, Hsinchu (TW); Chun-Che Chien, Taipei (TW)

(73) Assignee: Institute for Information Industry, Taipei (TW)

( * ) Notice: Subject to any disclaimer, the term of this patent is extended or adjusted under 35 U.S.C. 154(b) by 346 days.

(21) Appl. No.: 13/164,075

(22) Filed: Jun. 20, 2011

(65) Prior Publication Data

US 2012/0322361 A1    Dec. 20, 2012

(51) Int. Cl.
| | |
|---|---|
| H04B 3/36 | (2006.01) |
| H04B 7/14 | (2006.01) |
| H04B 7/15 | (2006.01) |
| H04B 7/00 | (2006.01) |
| H04B 7/17 | (2006.01) |
| H04B 17/02 | (2006.01) |
| H04J 1/10 | (2006.01) |
| H04J 3/08 | (2006.01) |
| H04L 25/20 | (2006.01) |
| H04L 25/52 | (2006.01) |

(52) U.S. Cl.
USPC .............. 455/7; 455/11.1; 455/15; 455/522; 370/279; 370/315; 375/211; 375/340

(58) Field of Classification Search
USPC .......... 455/7, 10, 11.1, 13.1, 13.3, 13.4, 15, 455/16, 17, 25, 63, 67.11, 69, 450, 522, 455/574; 340/291, 425.1, 853.7; 342/15, 342/353, 453; 370/75, 97, 226, 254, 274, 370/278, 279, 293, 315, 316, 329, 334, 492, 370/501, 536; 375/10, 211, 267, 340, 350

See application file for complete search history.

(56) References Cited

U.S. PATENT DOCUMENTS

| | | | |
|---|---|---|---|
| 2006/0074612 A1* | 4/2006 | Kent et al. ........................ | 703/2 |
| 2009/0286471 A1* | 11/2009 | Ma et al. ........................ | 455/10 |
| 2009/0316763 A1* | 12/2009 | Erkip et al. .................... | 375/211 |
| 2010/0151793 A1* | 6/2010 | Wang et al. ................. | 455/67.11 |
| 2011/0199957 A1* | 8/2011 | Oyman et al. ................ | 370/315 |
| 2011/0305172 A1* | 12/2011 | Dean ............................ | 370/279 |
| 2012/0039419 A1* | 2/2012 | Maddah-Ali et al. ......... | 375/340 |

* cited by examiner

*Primary Examiner* — Fayyaz Alam
*Assistant Examiner* — Paul P Tran
(74) *Attorney, Agent, or Firm* — Skaar Ulbrich Macari, P.A.

(57) ABSTRACT

A relay gain assignment method and a relay gain assignment device are provided. The method and the device are performed in a MIMO relay system comprising M spatial degrees of freedom and L relay terminals, wherein M and L are positive integers. The relay gain assignment method comprises the steps of: (a) defining a system model for the MIMO relay system, wherein the system model comprises a relay-connected noise and a destination-connected noise; (b) calculating power of the relay-connected noise and power of the destination-connected noise; (c) determining the dominating one between the power of the relay-connected noise and the power of the destination-connected noise; (d) defining a proper noise dominating model based on the determination result of the step (c); (e) calculating L relay gains for the L relay terminals; and (f) assigning each of the relay gains to the corresponding relay terminal of the MIMO relay system.

16 Claims, 4 Drawing Sheets

RELAY GAIN ASSIGNMENT METHOD AND RELAY GAIN ASSIGNMENT DEVICE

FIELD

The subject invention relates to a relay gain assignment method and a relay gain assignment device. More particularly, the subject invention relates to a relay gain assignment method and a relay gain assignment device that adopt a noise dominating model.

BACKGROUND

With rapid development of wireless communications, MIMO technology has aroused interest because of its possible applications in digital television (DTV), wireless local area networks (WLANs), metropolitan area networks (MANs), and mobile communications. In brief, MIMO is an antenna technology for wireless communications in which multiple antennas are used at both the source (i.e., transmitter) and the destination (i.e., receiver).

In MIMO wireless networks, a general resolution for improving performance of systems with limited transmission power and/or with long distance between the destination and the source is adopting a relay-assisted transmission. Furthermore, the relay-assisted transmission associated with an amplify-forwarding architecture which receives a signal from the source and forward to the destination after amplifying is a popular choice in the present relay technique for easier implementation.

Based on the amplify-forwarding architecture, using a single-antenna distributed configuration at least comprise the advantages of higher flexibility and spatial diversity so as to be easily and effectively designed. However, conventional relay-assisted transmissions having the single-antenna distributed configuration for use in a MIMO system faces the difficulty in efficiently optimizing the relay gains for capacity improvement. The major reason is that a necessary matrix determinant for the capacity calculation can not be readily resolved by conventional beamforming or matrix decomposition techniques.

In view of this, since no useful resolution to deal with the problem up to now, an urgent need exists in the art to effectively overcome the shortcomings of conventional relay-assisted transmissions having the single-antenna distributed configuration for use in a MIMO system.

SUMMARY

The objective of the subject invention is to provide a relay gain assignment method and a relay gain assignment device, which can effectively solve the problems of the prior art caused due to incapability to optimize capacity of MIMO system with a relay-assisted transmission having a single-antenna distributed configuration.

To achieve the aforesaid objective, certain embodiment of the subject invention provide a relay gain assignment method. The method is performed in a MIMO relay system comprising M spatial degrees of freedom and L relay terminals, wherein M and L are positive integers. The relay gain assignment method comprises the steps of: (a) defining a system model for the MIMO relay system according to channel information of the MIMO relay system, wherein the system model comprises a relay-connected noise and a destination-connected noise; (b) calculating power of the relay-connected noise and power of the destination-connected noise; (c) determining that the power of the relay-connected noise is smaller than the power of the destination-connected noise; (d) defining a destination-connected noise dominating model based on the determination result of the step (c); (e) calculating L relay gains for the L relay terminals according to the destination-connected noise dominating model; and (f) assigning each of the relay gains to the corresponding relay terminal of the MIMO relay system.

To achieve the aforesaid objective, certain embodiment of the subject invention further provide a relay gain assignment method. The method is performed in a MIMO relay system comprising M spatial degrees of freedom and L relay terminals, wherein M and L are positive integers. The relay gain assignment method comprises the steps of: (a) defining a system model for the MIMO relay system according to channel information of the MIMO relay system, wherein the system model comprises a relay-connected noise and a destination-connected noise; (b) calculating power of the relay-connected noise and power of the destination-connected noise; (c) determining that the power of the relay-connected noise is larger than the power of the destination-connected noise; (d) defining a relay-connected noise dominating model based on the determination result of the step (c); (e) calculating L relay gains for the L relay terminals according to the relay-connected noise dominating model; and (f) assigning each of the relay gains to the corresponding relay terminal of the MIMO relay system.

To achieve the aforesaid objective, certain embodiment of the subject invention provide a relay gain assignment device. The device is performed in a MIMO relay system comprising M spatial degrees of freedom and L relay terminals, wherein M and L are positive integers. The relay gain assignment device comprises a memory and a processor. The memory is configured to store channel information of the MIMO relay system. The processor electrically connected to the memory is configured to perform the following operations: defining a system model comprising a relay-connected noise and a destination-connected noise for the MIMO relay system according to the channel information, calculating power of the relay-connected noise and power of the destination-connected noise, defining a destination-connected noise dominating model after determining that the power of the relay-connected noise is smaller than the power of the destination-connected noise, calculating L relay gains for the L relay terminals according to the destination-connected noise dominating model, and assigning each of the relay gains to the corresponding relay terminal of the MIMO relay system.

To achieve the aforesaid objective, certain embodiment of the subject invention further provide a relay gain assignment device. The device is performed in a MIMO relay system comprising M spatial degrees of freedom and L relay terminals, wherein M and L are positive integers. The relay gain assignment device comprises a memory and a processor. The memory is configured to store channel information of the MIMO relay system. The processor electrically connected to the memory is configured to perform the following operations: defining a system model comprising a relay-connected noise and a destination-connected noise for the MIMO relay system according to the channel information, calculating power of the relay-connected noise and power of the destination-connected noise, defining a relay-connected noise dominating model after determining that the power of the relay-connected noise is larger than the power of the destination-connected noise, calculating L relay gains for the L relay terminals according to the destination-connected noise dominating model, and assigning each of the relay gains to the corresponding relay terminal of the MIMO relay system.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

In the following description, the subject invention will be explained with reference to example embodiments thereof. However, these example embodiments are not intended to limit the subject invention to any specific example, embodiment, environment, applications or particular implementations described in these example embodiments. Therefore, description of these example embodiments is only for purpose of illustration rather than to limit the subject invention. It should be appreciated that, in the following example embodiments and the attached drawings, elements not directly related to the subject invention are omitted from depiction; and dimensional relationships among individual elements in the attached drawings are illustrated only for ease of understanding, but not to limit the actual scale.

Figure 1:
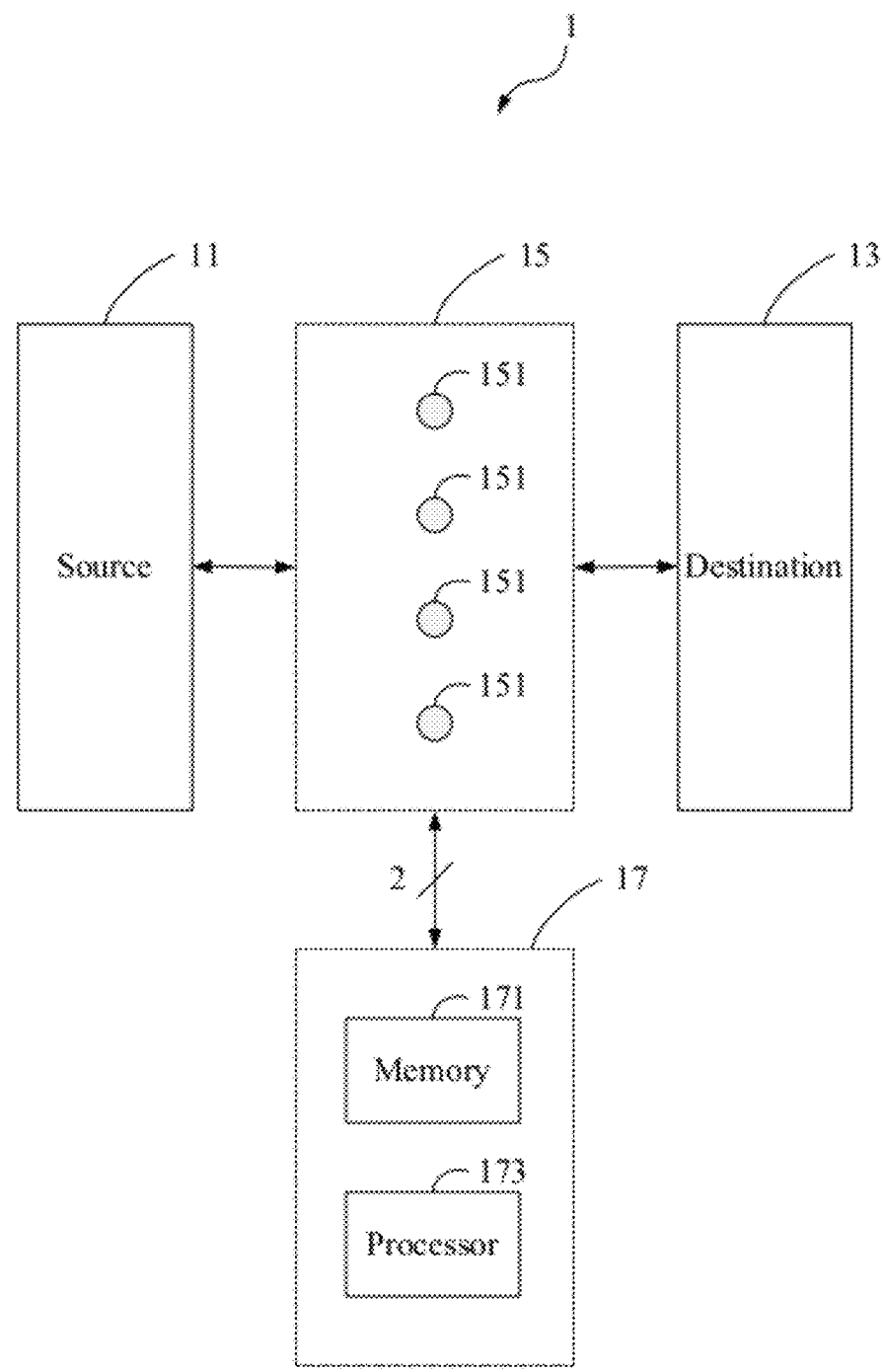
FIG. 1 is a schematic view of a MIMO relay system 1 according to the subject invention.

A first embodiment of the subject invention is as shown in FIG. 1, which is a schematic view of a MIMO relay system 1. As shown in FIG. 1, MIMO relay system 1 comprises a source 11, a destination 13, a channel 15 and a relay gain assignment device 17. In detail, source 11 may be a transmitter with M antennas and destination 13 may be a receiver with M antennas, which provides M spatial degrees of freedom of MIMO relay system 1. Note that M is a positive integer. Furthermore, channel 15 is a transmission medium between source 11 and destination 13 for signal transmission from source 11 to destination 13. It shall be appreciated that spatial degrees of freedom and fundamental principles of MIMO system will be readily appreciated by those of ordinary skill in the art, and thus will not be further described herein.

In this embodiment, the channel 15 comprises L relay terminals 151, and each of the L terminals 151 amplifies received signals and then forwards the amplified signals to the destination 13. It is noted that L is a positive integer and L is larger than M. Furthermore, each of the L relay terminals 151 has a single-antenna distributed relay configuration, wherein the single-antenna distributed relay configuration means that each of the L relay terminals 151 is only equipped with one antenna, and no cooperation exists among the L relay terminals 151. The single-antenna distributed relay configuration may also mean that each of the L relay terminals 151 may be equipped with several antennas; however, for each terminal 151, only one of the antennas is enabled and the rest antennas are disabled.

In this embodiment, the MIMO relay system 1 is equipped with an individual device, i.e. the relay gain assignment device 17, for calculating the relay gains. Nevertheless, the operations performed by the relay gain assignment device 17 may be performed in the source 11, destination 13, or channel 15 as long as the channel information 2 of MIMO relay system 1 can be derived by these devices. In other words, the source 11, destination 13, and the channel 15 can play the role of the relay gain assignment device 17 if these devices have the channel information 2. Furthermore, the relay gain assignment device 17 comprises a memory 171 and a processor 173 electrically connected to the memory 171, and the memory 171 is configured to store channel information 2 of the MIMO relay system 1. Further speaking, the processor 173 is configured to perform the following operations.

The processor 173 defines a system model which comprises a relay-connected noise and a destination-connected noise for the MIMO relay system 1 according to the channel information 2. Note that the relay-connected noise is defined as the noise received at the L relay terminals 151 and the destination-connected noise is defined as the noise received at the destination herein. For example, a proper system model for the MIMO relay system 1 can be expressed as:

$$y = FRG^H x + FRn_R + n_D \tag{1}$$

wherein y denotes a signal vector received by the destination 13, F denotes a channel matrix representing channel characteristics between the destination 13 and the L relay terminals 151, R denotes an unknown relay gain matrix, G denotes a channel matrix representing channel characteristics between the source 11 and the L relay terminals 151, $(\bullet)^H$ denotes matrix conjugate transpose, x denotes a signal vector transmitted by the source 11, $n_R$ denotes the relay-connected noise (i.e. a noise vector representing the received noise at the L relay terminals 151), and $n_D$ denotes the destination-connected noise (i.e. a noise vector representing the received noise at the destination 13). It shall be appreciated that the equation (1) is only for descriptions of the subject invention and is not limited herein.

Next, the processor 173 calculates power of the relay-connected noise and power of the destination-connected noise. In this embodiment, the processor determines that the power of the relay-connected noise is smaller than the power of the destination-connected noise, so it then defines a destination-connected noise dominating model. When the system model for the MIMO relay system 1 is expressed as the equation (1), the destination-connected noise dominating model defined by the processor 173 can be expressed as $$y = FRG^H x + n_D \tag{2}$$

Afterwards, the processor 173 calculates L relay gains for the L relay terminals 151 according to the destination-connected noise dominating model, and then assigns each of the relay gains to the corresponding relay terminal of the MIMO relay system 1. Herein below, how the processor 173 calculates the L relay gains for the L relay terminals 151 will be elucidated from two aspects, i.e. with and without considering of relay selections.

In the first aspect, the L relay gains are calculated based on a relay selection approach according to the destination-connected noise dominating model. Specifically, the processor 173 further determines that M is smaller than L. Next, the processor 173 selects M relay terminals out of the L relay terminals 151 and then calculates M relay gains for the selected M relay terminals. Then, the processor 173 determines that the calculated M relay gains make the MIMO relay system have the largest capacity when the number of the relay terminals in use is M. Subsequently, the processor 173 sets the relay gains for the unselected relay terminals as zero.

For example, the processor 173 sets $$\binom{L}{M}$$

combinations to represent all possible selections of choosing M relay terminals out of the L relay terminals. For each of the combinations, the processor 173 perform the following operations: (i) defining $F_i$ and $G_i$ as the submatrix of F and G respective for the ith combination, wherein $F_i$ and $G_i$ is corresponding to the selected M relay terminals; (ii) denoting the relay gains vector as $r_s$ and set its kth term ($1 \leq k \leq M$) as $$r_s(k) = \sqrt{\frac{P_R}{M(\sigma_R^2 + \|G_i^{(k)}\|^2)}}$$

for the ith combination, wherein $P_R$ denotes the total relay transmission power, $\sigma_R^2$ denotes the received noise power at the L relay terminals, and $\|G_i^{(k)}\|^2$ denotes the square of 2-norm of the kth column in $G_i$; and (iii) computing the capacity as $$C_i = \log\left|\det(F_i)\det(G_i)\prod_{k=1}^{M} r_s(k)\right|$$

for the ith combination. Thereafter, the processor 173 finds the combination with largest capacity $C_i$ to set relay gains for the selected relay terminals in this combination accordingly and sets the relay gains for the unselected relay terminals as zero. It shall be appreciated that, the example is for exemplificative illustrated for this embodiment, but not be limited to the subject invention.

In the second aspect, the L relay gains are directly calculated for the destination-connected noise dominating model without considering of relay selections. Specifically, the processor 173 determines that M is smaller than L. Next, the processor 173 calculates L relay gains for the L relay terminals, wherein the L relay gains maximize the capacity of the MIMO relay system.

For example, the processor 173 may perform the following operations of: (i) choosing the upper-half parts of H, except the diagonal terms thereof to be zero-forced, wherein H denotes the result of $FRG^H$; (ii) defining $H_R$ based on F and G such that $H_R r$ represents the diagonal terms of H and defining $H_N$ based on F and G such that $H_N r$ represents the terms of H chosen in operation (i); (iii) defining diagonal matrix S whose ith diagonal term is equal to $(\sigma_R^2 + \|G^{(i)}\|^2)^{-0.5}$, wherein $|G^{(i)}|^2$ the square of 2-norm of the ith column in G; (iv) defining $V_N$ the orthogonal basis of the null space of $H_N S$; (v) defining matrices A, $\Sigma$ and $V_R$ based on a singular value decomposition (SVD) such that $A\Sigma V_R^H = H_R S V_N$ where both A and $V_R$ have orthonormal vectors and $\Sigma$ is a diagonal matrix; (vi) defining vector θ by randomly choose all the terms between 0 and $2\pi$; (vii) setting column index $k = m(i,M)+1$, wherein i denotes the iteration index and $m(i,M)$ denotes the value of i modulo M; (viii) defining vector u as the kth column of $\Sigma^{-1} A^{-1}$ and defining $u_0$ as $\Sigma^{-1} A^{-1} \theta$ after setting θ(k) the as zero; (ix) defining $\theta_\Delta$ such that $\theta_\Delta(l) = \exp(j\angle u(l) - j u_0(l)) \forall l$; (x) setting θ(k) as $$\theta(k) = \exp\left(\frac{-\sum_{e=1}^{M} |u(e)u_0(e)\sin\angle\theta_\Delta(e)|}{\sum_{e=1}^{M} |u(e)u_0(e)\cos\angle\theta_\Delta(e)|}\right);$$

(xi) increase i by one and go back to (vii), or go to (xii) if some stop criteria are satisfied (xii) setting the L relay gains r as $SV_N V_R \Sigma^{-1} A^{-1} \theta$. It shall be appreciated that, the example is for exemplificative illustrated for this embodiment, but not be limited to the subject invention.

A second embodiment of the subject invention is also as shown in FIG. 1. Specifically, the second embodiment is also a MIMO relay system like MIMO relay system 1 described in the first embodiment. Furthermore, the second embodiment of the subject invention is similar to the first embodiment, and the major difference between them will be further described hereinafter.

In this embodiment, the processor 173 defines a system model which comprises a relay-connected noise and a destination-connected noise for the MIMO relay system 1 according to the channel information 2. Note that the relay-connected noise is defined as noise received at the L relay terminals 151 and the destination-connected noise is defined as noise received at the destination 13 herein. For example, the system model can be expressed as equation (1) described in the first embodiment.

Next, the processor 173 calculates power of the relay-connected noise and power of the destination-connected noise, and defines a destination-connected noise dominating model after determining that the power of the relay-connected noise is larger than the power of the destination-connected noise. When the system model for the MIMO relay system 1 is expressed as the equation (1), the relay-connected noise dominating model defined by the processor 173 can be expressed as $$y = FRG^H x + FR n_R \qquad (3)$$

Afterwards, the processor 173 calculates L relay gains for the L relay terminals according to the relay-connected noise dominating model, and then assigns each of the relay gains to the corresponding relay terminal of the MIMO relay system. Similarly, in this embodiment, the processor 173 can calculate L relay gains for the L relay terminals from two aspects, i.e. with and without considering of relay selections.

In the first aspect, the L relay gains based on a relay selection approach are calculated for the relay-connected noise dominating model. Specifically, the processor 173 determines that L is larger than M at first. Next, the processor 173 selects M+1 relay terminals out of the L relay terminals and then calculates M+1 relay gains for the selected M+1 relay terminals. Meanwhile, the processor 173 determines that the calculated M+1 relay gains make the MIMO relay system have the largest capacity when the number of the relay terminals in use is M+1. Subsequently, the processor 173 sets the relay gains for the unselected relay terminals as zero.

For example, the processor 173 may perform the following operations of: (i) setting $$\binom{L}{M+1}$$

combinations to represent all possible selection of choosing M+1 relay terminals out of the L relay terminals; (ii) defining $F_i$ and $G_i$ as the submatrix of F and G respective for the ith combination, wherein $F_i$ and $G_i$ is corresponding to the selected M+1 relay terminals; (iii) denoting the relay gains vector as $r_s$ for the ith combination; (iv) computing the capacity as $C_i = \log |\det(I + \sigma_R^{-2} G_i G_i^H)|$ for the ith combination, wherein I denotes a identity matrix, and $\sigma_R^2$ denotes the received noise power at the L relay terminals; (v) repeating operations (ii) to (iv) until all combination are computed; (vi) assuming the selected combination indexed with k; (vii) setting matrix O to be a matrix of basis vectors for the orthogonal complement of the row space of $G_k$ such that $G_k O = 0$, wherein 0 denotes a zero vector; (viii) setting matrix $\Phi$ to be a (M+1)×M matrix as $\Phi = [D(F_k^{<1>}) O\ D(F_k^{<2>}) O \ldots D(F_k^{<M>}) O]$, wherein D(x) denotes a diagonal matrix made by setting its diagonal terms as x; (ix) setting $r_s$ such that $r_s^T \Phi = 0$ and then scaling the resulting $r_s$ based on $P_R$ so as to find the combination with largest capacity $C_i$ to set relay gains for the selected relay terminals, wherein $P_R$ denotes the total relay transmission power; and (x) setting the relay gains for the unselected relay terminals as zero. It shall be appreciated that, the example is for exemplificative illustrated for this embodiment, but not be limited to the subject invention.

In the second aspect, the L relay gains are directly calculated for the relay-connected noise dominating model without considering of relay selections. Specifically, the processor 173 determines that M is smaller than L at first. Next, the processor 173 calculates L relay gains for the L relay terminals, wherein the L relay gains maximize the capacity of the MIMO relay system.

For example, the processor 173 may perform the following operations of: (i) setting matrix $O_R$ and O to be matrices of basis vectors for range and null subspace of the row space of G; (ii) setting matrix $\Psi$ as $\Psi = [D(F^{<1>}) O_R\ D(F^{<2>}) O_R \ldots D(F^{<M>}) O_R]$; (iii) setting matrix $\Phi$ as $\Phi = [D(F^{<1>}) O\ D(F^{<2>}) O \ldots D(F^{<M>}) O]$; and (iv) setting r as the eigenvector of $(\Phi \Phi^H)^{-1} \Psi \Psi^H$ corresponding to the maximal eigenvalue, then scaling the resulting r based on $P_R$, wherein $P_R$ denotes the total relay transmission power. It shall be appreciated that, the example is for exemplificative illustrated for this embodiment, but not be limited to the subject invention.

Figure 2A:
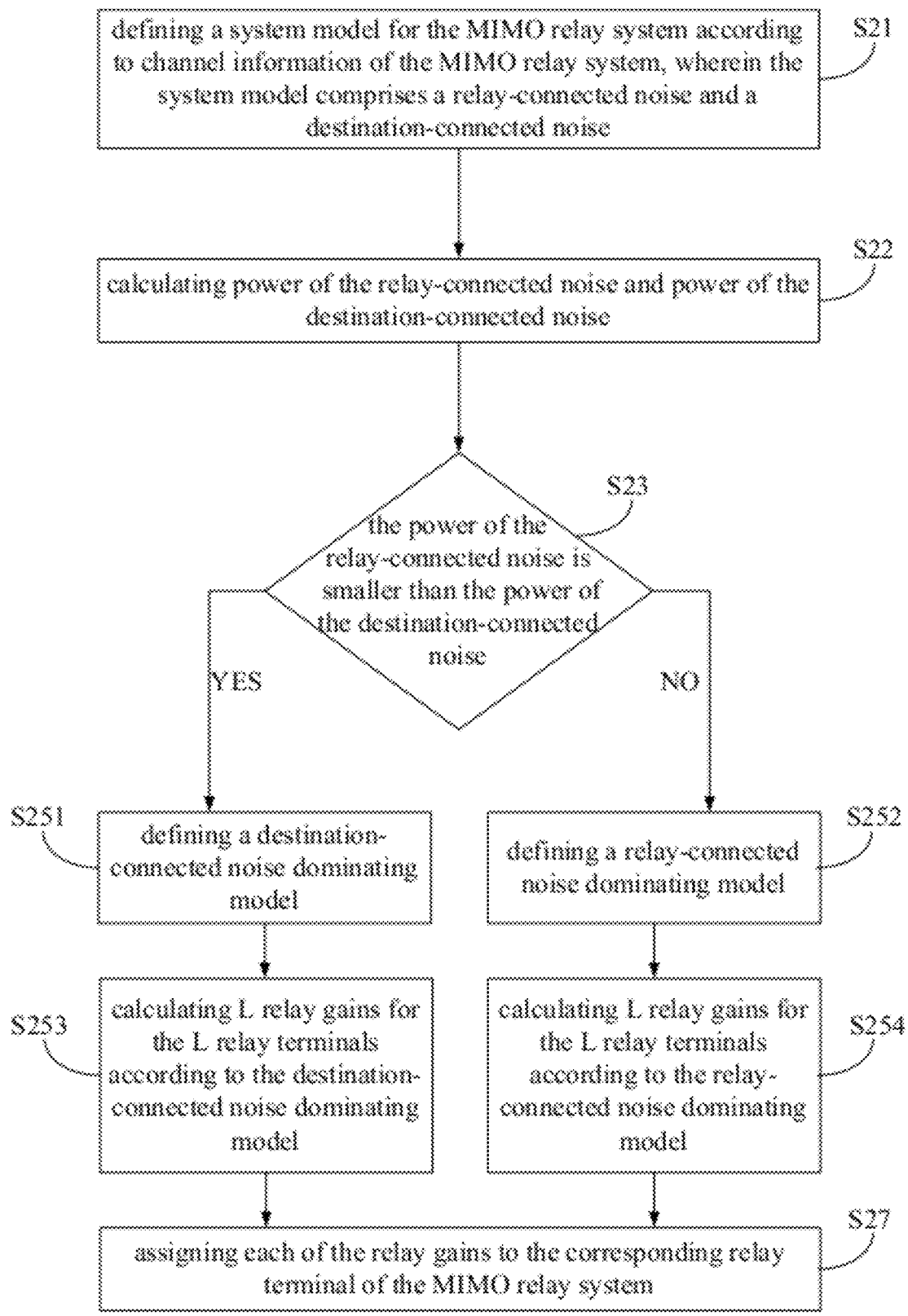
FIG. 2A is a flowchart of a third and a fourth embodiment of the subject invention.

A third embodiment of the subject invention is shown in FIG. 2A, which is a flowchart of a relay gain assignment method for use in a relay gain assignment device as described in the first embodiment. The relay gain assignment method is performed in a MIMO relay system comprising M spatial degrees of freedom and L relay terminals, wherein M and L are positive integers and L is larger than M.

Referring to FIG. 2A, step S21 is executed by the relay gain assignment device to define a system model for the MIMO relay system according to channel information of the MIMO relay system, wherein the system model comprises a relay-connected noise and a destination-connected noise. Then, step S22 is executed by the relay gain assignment device to calculate power of the relay-connected noise and power of the destination-connected noise. Next, step S23 is executed by the relay gain assignment device to determine whether the power of the relay-connected noise is smaller than the power of the destination-connected noise. In this embodiment, the power of the relay-connected noise is smaller than the power of the destination-connected noise, so step S251 is executed to define a destination-connected noise dominating model. Afterwards, step S253 is executed by the relay gain assignment device to calculate L relay gains for the L relay terminals according to the destination-connected noise dominating model. Finally, step S27 is executed by the relay gain assignment device to assign each of the relay gains to the corresponding relay terminal of the MIMO relay system.

Figure 2B:
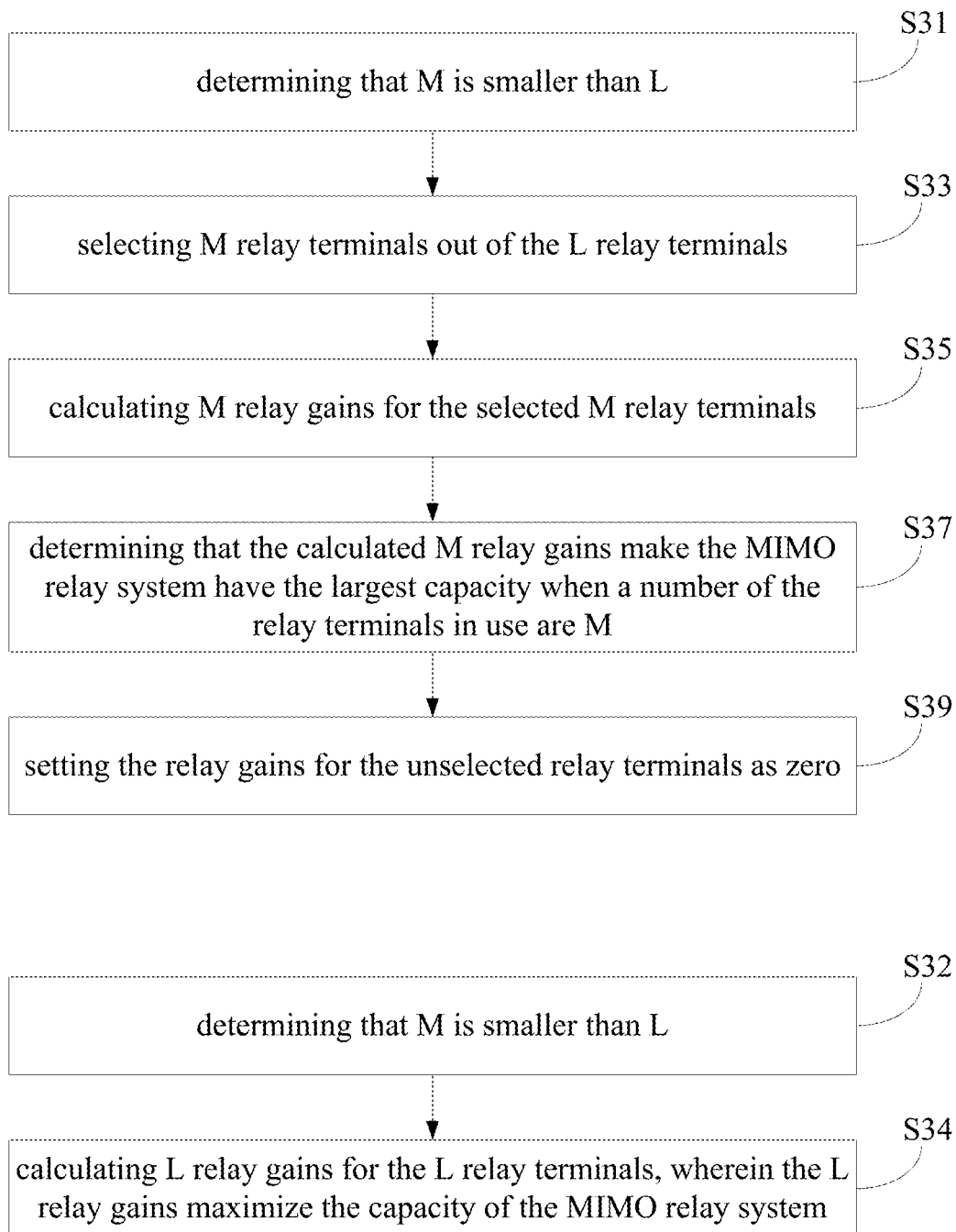
FIG. 2B is a detailed flowchart of the third embodiment of the subject invention.

Two advanced procedures of the step S253 are shown in FIG. 2B, which shows calculating steps of L relay gains with and without considering of relay selections for the L relay terminals. With relay selections, the step S253 comprises steps S31, S33, S35, S37 and S39 which are executed by the relay gain assignment device to calculate L relay gains for the L relay terminals for the destination-connected noise dominating model. Referring to FIG. 2B, the step S31 is executed by the relay gain assignment device to determine that M is smaller than L. Then, the step S33 is executed by the relay gain assignment device to select M relay terminals out of the L relay terminals, and the step S35 is executed by the relay gain assignment device to calculate M relay gains for the selected M relay terminals. Next, the step S37 is executed by the relay gain assignment device to determine that the calculated M relay gains make the MIMO relay system have the largest capacity when the number of the relay terminals in use is M. Finally, the step S39 is executed by the relay gain assignment device to set the relay gains for the unselected relay terminals as zero.

Without relay selections, the step S253 comprises steps S32 and S34 which are executed to calculate L relay gains for the L relay terminals for the destination-connected noise dominating model. Referring to FIG. 2B again, the step S32 is executed by the relay gain assignment device to determine that M is smaller than L, and then the step S34 is executed by the relay gain assignment device to calculate L relay gains for the L relay terminals, wherein the L relay gains maximize the capacity of the MIMO relay system.

It shall be appreciated that, in addition to the aforesaid steps, the third embodiment can also execute all the operations and functions set forth in the first embodiment. How the third embodiment executes these operations and functions will be readily appreciated by those of ordinary skill in the art based on the explanation of the first embodiment, and thus will not be further described herein.

A fourth embodiment of the subject invention is shown in FIG. 2A, which is also a flowchart of a relay gain assignment method for use in a relay gain assignment device as described in the second embodiment. The relay gain assignment method is performed in a MIMO relay system comprising M spatial degrees of freedom and L relay terminals, wherein M and L are positive integers and L is larger than M. Referring to FIG. 2A, step S21 is executed by the relay gain assignment device to define a system model for the MIMO relay system according to channel information of the MIMO relay system, wherein the system model comprises a relay-connected noise and a destination-connected noise. Then, step S22 is executed by the relay gain assignment device to calculate power of the relay-connected noise and power of the destination-connected noise. Next, step S23 is executed by the relay gain assignment device to determine whether the power of the relay-connected noise is smaller than the power of the destination-connected noise. In this embodiment, the power of the relay-connected noise is not smaller than the power of the destination-connected noise. Then, step S252 is executed by the relay gain assignment device to define a relay-connected noise dominating model based on the determination result of the step S23. Afterwards, step S254 is executed by the relay gain assignment device to calculate L relay gains for the L relay terminals according to the relay-connected noise dominating model. Finally, step S27 is executed by the relay gain assignment device to assign each of the relay gains to the corresponding relay terminal of the MIMO relay system.

Figure 2C:
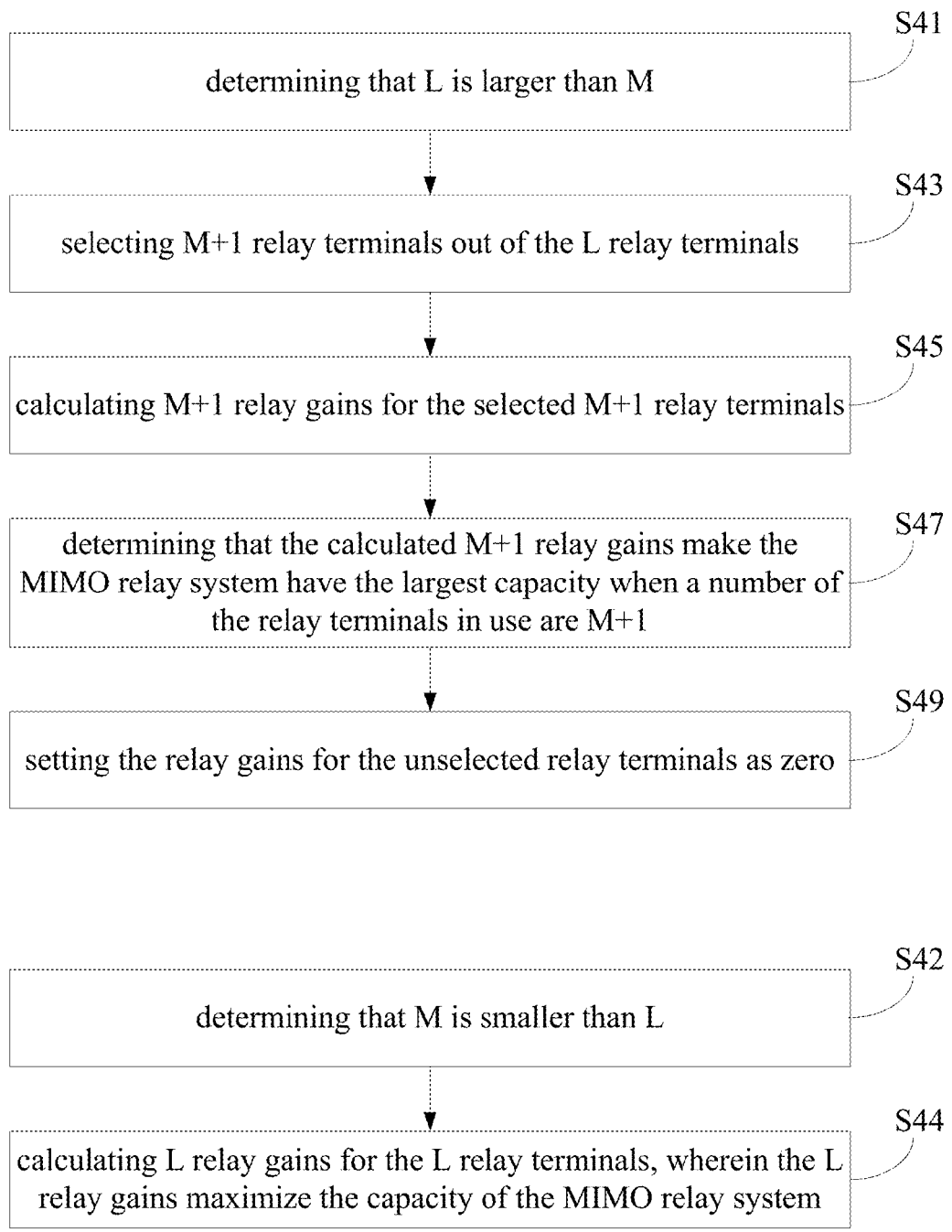
FIG. 2C is a detailed flowchart of the fourth embodiment of the subject invention.

Two advanced procedures of the step S254 are shown in FIG. 2C, which shows calculating steps of L relay gains with and without considering of relay selections for the L relay terminals. With relay selections, the step S254 comprises steps S41, S43, S45, S47 and S49 which are executed to calculate L relay gains for the L relay terminals for the relay-connected noise dominating model. Referring to FIG. 2C, the step S41 is executed by the relay gain assignment device to determine that L is larger than M. Then, the step S43 is executed by the relay gain assignment device to select M+1 relay terminals out of the L relay terminals, and the step S45 is executed by the relay gain assignment device to calculate M+1 relay gains for the selected M+1 relay terminals. Next, the step S47 is executed by the relay gain assignment device to determine that the calculated M+1 relay gains make the MIMO relay system have the largest capacity when the number of the relay terminals in use is M+1. Finally, the step S49 is executed by the relay gain assignment device to set the relay gains for the unselected relay terminals as zero.

Without relay selections, the step S254 comprises steps S42 and S44 which are executed to calculate L relay gains for the L relay terminals for the relay-connected noise dominating model. Referring to FIG. 2C again, the step S42 is executed by the relay gain assignment device to determine that M is smaller than L, and then the step S44 is executed by the relay gain assignment device to calculate L relay gains for the L relay terminals, wherein the L relay gains maximize the capacity of the MIMO relay system.

It shall be appreciated that, in addition to the aforesaid steps, the fourth embodiment can also execute all the operations and functions set forth in the second embodiment. How the fourth embodiment executes these operations and functions will be readily appreciated by those of ordinary skill in the art based on the explanation of the second embodiment, and thus will not be further described herein.

According to the above descriptions, by defining a noise dominating model, the relay gain assignment method and the relay gain assignment device is capable of optimizing each of the relay gains to the corresponding relay terminals of to maximize capacity a MIMO relay system. Thereby, the problems of the prior art caused due to incapability to optimize capacity of MIMO system with a relay-assisted transmission having a single-antenna distributed configuration can be effectively solved.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A relay gain assignment method, performed in a multiple-input and multiple-output (MIMO) relay system, the MIMO relay system comprising M spatial degrees of freedom and L relay terminals, the relay gain assignment method comprising the steps of:
   (a) defining a system model for the MIMO relay system according to channel information of the MIMO relay system, wherein the system model comprises a relay-connected noise and a destination-connected noise;
   (b) calculating power of the relay-connected noise and power of the destination-connected noise;
   (c) determining that the power of the relay-connected noise is smaller than the power of the destination-connected noise;
   (d) defining a destination-connected noise dominating model based on the determination result of the step (c);
   (e) calculating L relay gains for the L relay terminals according to the destination-connected noise dominating model; and
   (f) assigning each of the relay gains to the corresponding relay terminal of the MIMO relay system,
   wherein M and L are positive integers.

2. The relay gain assignment method as claimed in claim 1, wherein the step (e) comprises the steps of:
   (e1) determining that M is smaller than L;
   (e2) selecting M relay terminals out of the L relay terminals;
   (e3) calculating M relay gains for the selected M relay terminals;
   (e4) determining that the calculated M relay gains make the MIMO relay system have the largest capacity when the number of the relay terminals in use is M; and
   (e5) setting the relay gains for the unselected relay terminals as zero.

3. The relay gain assignment method as claimed in claim 1, wherein the step (e) further comprises the step of:
   (e1) determining that M is smaller than L; and
   (e2) calculating L relay gains for the L relay terminals, wherein the L relay gains maximize the capacity of the MIMO relay system.

4. The relay gain assignment method as claimed in claim 1, wherein each of the L relay terminals has a single-antenna distributed configuration.

5. A relay gain assignment method, performed in a multiple-input and multiple-output (MIMO) relay system, the MIMO relay system comprising M spatial degrees of freedom and L relay terminals, the relay gain assignment method comprising the steps of:
   (a) defining a system model for the MIMO relay system according to channel information of the MIMO relay system, wherein the system model comprises a relay-connected noise and a destination-connected noise;
   (b) calculating power of the relay-connected noise and power of the destination-connected noise;
   (c) determining that the power of the relay-connected noise is larger than the power of the destination-connected noise;
   (d) defining a relay-connected noise dominating model based on the determination result of the step (c);
   (e) calculating L relay gains for the L relay terminals according to the relay-connected noise dominating model; and
   (f) assigning each of the relay gains to the corresponding relay terminal of the MIMO relay system,
   wherein M and L are positive integers.

6. The relay gain assignment method as claimed in claim 5, wherein M is smaller than L and the step (e) comprises the steps of:
   (e1) determining that L is larger than M;
   (e2) selecting M+1 relay terminals out of the L relay terminals;
   (e3) calculating M+1 relay gains for the selected M+1 relay terminals;
   (e4) determining that the calculated M+1 relay gains make the MIMO relay system have the largest capacity when the number of the relay terminals in use is M+1; and
   (e5) setting the relay gains for the unselected relay terminals as zero.

7. The relay gain assignment method as claimed in claim 5, wherein M is smaller than L, the step (e) further comprises the step of:

(e1) determining that M is smaller than L; and (e2) calculating L relay gains for the L relay terminals, wherein the L relay gains maximize the capacity of the MIMO relay system.

8. The relay gain assignment method as claimed in claim 5, wherein each of the L relay terminals has a single-antenna distributed relay configuration.

9. A relay gain assignment device, performed in a MIMO relay system, the MIMO relay system comprising M spatial degrees of freedom and L relay terminals, the relay gain assignment device comprising:
   a memory, being configured to store channel information of the MIMO relay system; and
   a processor electrically connected to the memory, being configured to perform the following operations:
      defining a system model comprising a relay-connected noise and a destination-connected noise for the MIMO relay system according to the channel information,
      calculating power of the relay-connected noise and power of the destination-connected noise,
      defining a destination-connected noise dominating model after determining that the power of the relay-connected noise is smaller than the power of the destination-connected noise,
      calculating L relay gains for the L relay terminals according to the destination-connected noise dominating model, and
      assigning each of the relay gains to the corresponding relay terminal of the MIMO relay system;
   wherein M and L are positive integers.

10. The relay gain assignment device as claimed in claim 9, wherein the processor further perform the operations of:
    determining that M is smaller than L;
    selecting M relay terminals out of the L relay terminals,
    calculating M relay gains for the selected M relay terminals,
    determining that the calculated M relay gains make the MIMO relay system have the largest capacity when the number of the relay terminals in use is M, and
    setting the relay gains for the unselected relay terminals as zero.

11. The relay gain assignment device as claimed in claim 9, wherein the processor further perform the operations of:
    determining that M is smaller than L; and
    calculating L relay gains for the L relay terminals, wherein the L relay gains maximize the capacity of the MIMO relay system.

12. The relay gain assignment method as claimed in claim 9, wherein each of the L relay terminals has a single-antenna distributed relay configuration.

13. A relay gain assignment device, performed in a MIMO relay system, the MIMO relay system comprising M spatial degrees of freedom and L relay terminals, the relay gain assignment device comprising:
    a memory, being configured to store channel information of the MIMO relay system; and
    a processor electrically connected to the memory, being configured to perform the following operations:
       defining a system model comprising a relay-connected noise and a destination-connected noise for the MIMO relay system according to the channel information,
       calculating power of the relay-connected noise and power of the destination-connected noise,
       defining a relay-connected noise dominating model after determining that the power of the relay-connected noise is larger than the power of the destination-connected noise,
       calculating L relay gains for the L relay terminals according to the destination-connected noise dominating model, and
       assigning each of the relay gains to the corresponding relay terminal of the MIMO relay system;
    wherein M and L are positive integers.

14. The relay gain assignment device as claimed in claim 13, wherein the processor further perform the operations of:
    determining that L is larger than M,
    selecting M+1 relay terminals out of the L relay terminals
    calculating M+1 relay gains for the selected M+1 relay terminals;
    determining that the calculated M+1 relay gains make the MIMO relay system have the largest capacity when the number of the relay terminals in use is M+1; and
    setting the relay gains for the unselected relay terminals as zero.

15. The relay gain assignment device as claimed in claim 13, wherein the processor further perform the operations of:
    determining that M is smaller than L; and
    calculating L relay gains for the L relay terminals, wherein the L relay gains maximize the capacity of the MIMO relay system.

16. The relay gain assignment method as claimed in claim 13, wherein each of the L relay terminals has a single-antenna distributed relay configuration.

* * * * *